Feb. 9, 1960 F. W. LIVERMONT 2,924,463
TRAILER FRAME SUPPORT
Filed July 7, 1959 2 Sheets-Sheet 1

INVENTOR.
FRANK W. LIVERMONT
BY
ATTORNEYS.

Feb. 9, 1960 F. W. LIVERMONT 2,924,463
TRAILER FRAME SUPPORT
Filed July 7, 1959 2 Sheets-Sheet 2
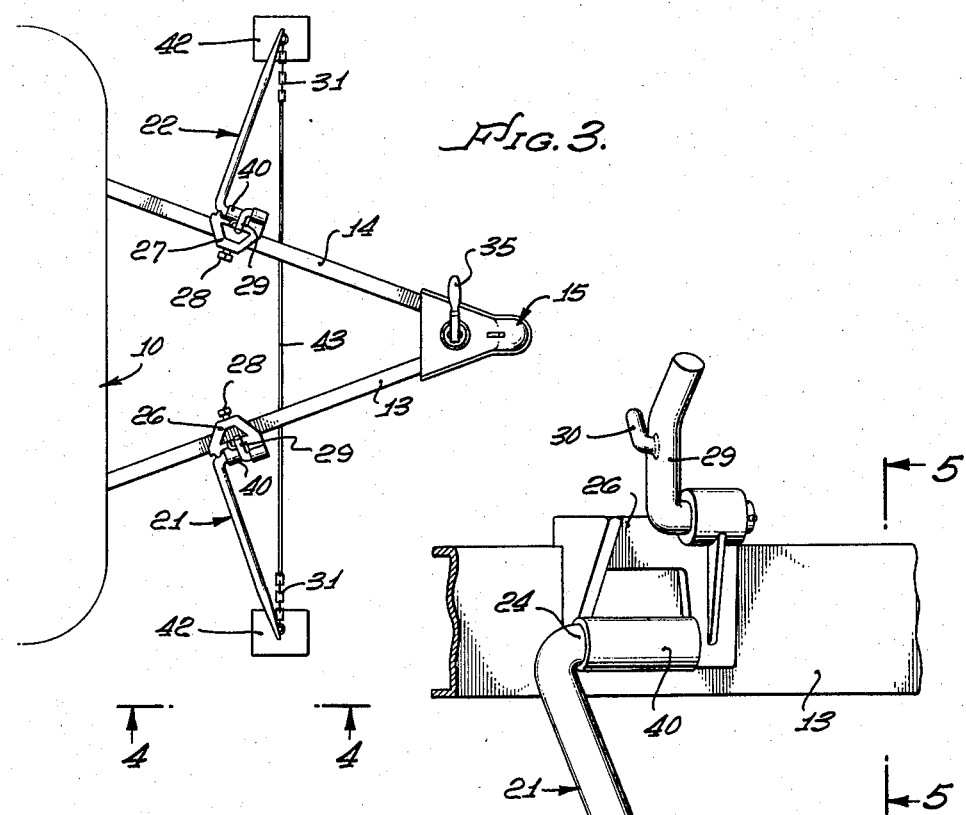
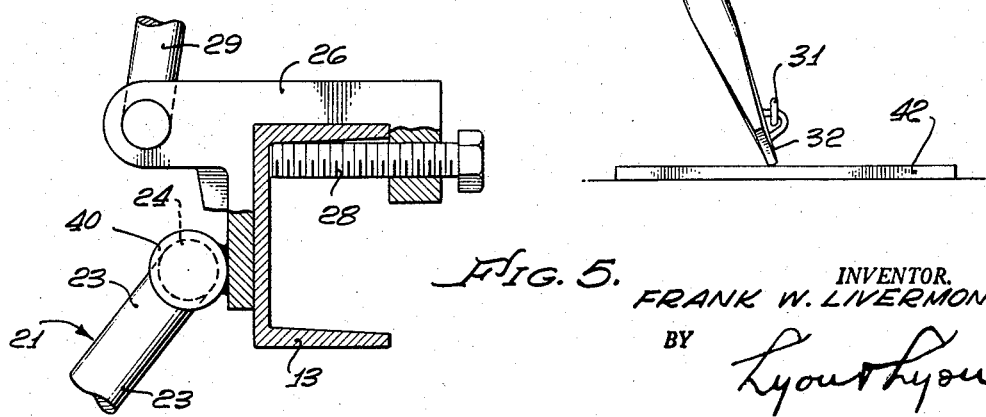
INVENTOR.
FRANK W. LIVERMONT
BY
ATTORNEYS.

United States Patent Office 2,924,463
Patented Feb. 9, 1960

2,924,463

TRAILER FRAME SUPPORT

Frank W. Livermont, Duarte, Calif.

Application July 7, 1959, Serial No. 825,499

3 Claims. (Cl. 280—150.5)

This invention relates to trailer vehicles and is particularly directed to improvements in devices for supporting the forward end of a house trailer when it is disconnected from the towing vehicle.

House trailer frames of conventional design commonly employ a pair of horizontal frame members which diverge from a trailer hitch assembly mounted at the forward end. An auxiliary wheel is commonly provided for use when the trailer is disconnected from the towing vehicle, and this auxiliary wheel is carried on a vertically movable post member mounted on the trailer hitch assembly. A crank is provided which may be manually operated to raise or lower the post relative to the diverging frame members and hence raise or lower the forward end of the house trailer.

When the house trailer is disconnected from the towing vehicle and it rests on the main road wheels and auxiliary wheel at the forward end of the frame, the trailer lacks lateral stability. Consequently, persons moving about within the house trailer when thus supported find that the trailer rocks and tilts in disagreeable fashion because of the moving weight of the occupants. To overcome this objectionable tilting movement, screw jacks of conventional design are commonly placed under the four corners of the house trailer body and these jacks rest on the ground. The task of placing the jacks and adjusting them to level the floor of the house trailer is disagreeable because the jacks are heavy and cumbersome, because they must be placed and adjusted under the house trailer frame in positions which may be difficult of access.

In accordance with my invention, I eliminate the need for the levelling jacks, at least at the forward end of the house trailer, by providing an improved form of ground-support which utilizes the weight of the trailer to prevent it from tilting. This is accomplished by means of a pair of struts which extend outward from socket pieces mounted on the diverging frame members near the front of the trailer.

The struts are inclined at an angle and their outer ends rest on the ground. A tension member extends between these outer ends to prevent spreading when the weight of the trailer is imposed upon them.

Other objects and advantages will appear hereinafter.

In the drawings:

Figure 3 is a top plan view of the trailer frame support shown in Figure 2.

Figure 4 is a side view partly broken away taken in the direction of the lines 4—4 as shown in Figure 3.

Figure 5 is a sectional elevation taken on lines 5—5 as shown in Figure 4.

Figure 1:
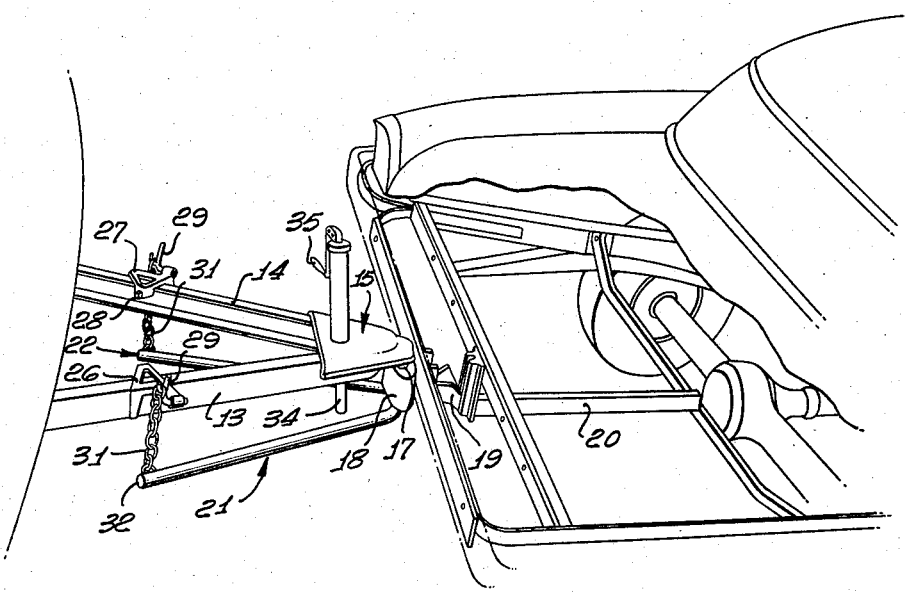
Figure 1 is a perspective view partly broken away, showing a common form of trailer hitch assembly employing helper spring bars.

Referring to the drawings, a house trailer generally designated 10 includes a body mounted upon a frame 11 and supported on ground wheels 12. The frame 11 includes a pair of horizontal frame members 13 and 14 which are joined to a trailer hitch connection part 15 at their forward ends. These frame members 13 and 14 diverge from the trailer hitch assembly toward the trailer body 10. As shown in Figure 1, the trailer hitch connection part 15 includes a socket which receives the usual ball carried on the stationary post 17. This post is fixed relative to the head 18 carried on the bracket 19 and connected to the draft bar 20. The head 18 is provided with vertically extending laterally spaced openings which receive upwardly directed end portions of spring bars or struts 21 and 22. These spring bars or struts are duplicate and each is provided with a straight shank 23 having the upwardly directed end portion or stem 24 integrally joined thereto.

Brackets 26 and 27 are fixed by any convenient means, such as for example, by set screws 28 to the diverging frame members 13 and 14 and each of these brackets carries a pivoted lever 29 provided with a chain-engaging finger 30. A short length of chain 31 is attached to the projecting end 32 of each strut 21 and 22 and the struts are swung to a position generally parallel to and underlying the diverging frame members 13 and 14. A link of each chain is engaged over one of the fingers 30 and the levers 29 are swung to an "over-center" position to tension the chains 31 and impose bending stresses on the shanks 23 of the struts or helper springs 21. The purpose of this arrangement is to avoid excessive lowering of the rear end of the towing vehicle, occasioned by the weight of the forward end of the trailer.

When the trailer hitch parts are to be disconnected, the auxiliary wheel 33 is connected to the lower end of the vertically movable post 34 carried on the connection part 15. The crank 35 is manually operated to lower the post 34 with respect to the frame members 13 and 14 and to bring the wheel 33 in contact with the ground. Continued operation of the crank 35 serves to raise the forward end of the trailer frame 11 and thus permit disconnection of the parts 15 and 16. The levers 29 are operated to release the chains 31 from the fingers 30. The helper springs or struts 21 may then be withdrawn downwardly from the parallel openings in the head 18. The towing vehicle may then be moved away, leaving the forward end of the trailer 10 supported on the auxiliary wheel 33.

In accordance with my invention a tubular socket element 40 is mounted in horizontal position on each of the diverging frame members 13 and 14. The axis of each socket element is parallel to its respective frame member. These socket elements 40 may be mounted directly on the frame members or, as shown in the drawings, mounted on the brackets 26 and 27 which are fixed to the frame members. The forward end of each socket element is closed to prevent entry of foreign matter when the device is travelling over the road. The socket elements slidably receive the stems 24 of the struts 21 and 22, and the shank portions 23 of the struts extend downward and outward with the outer ends of the struts resting on the ground or on pads 42 as shown. A tension bar 43 is provided with a hook 44 at each end for engaging links of the chains 31.

Figure 2:
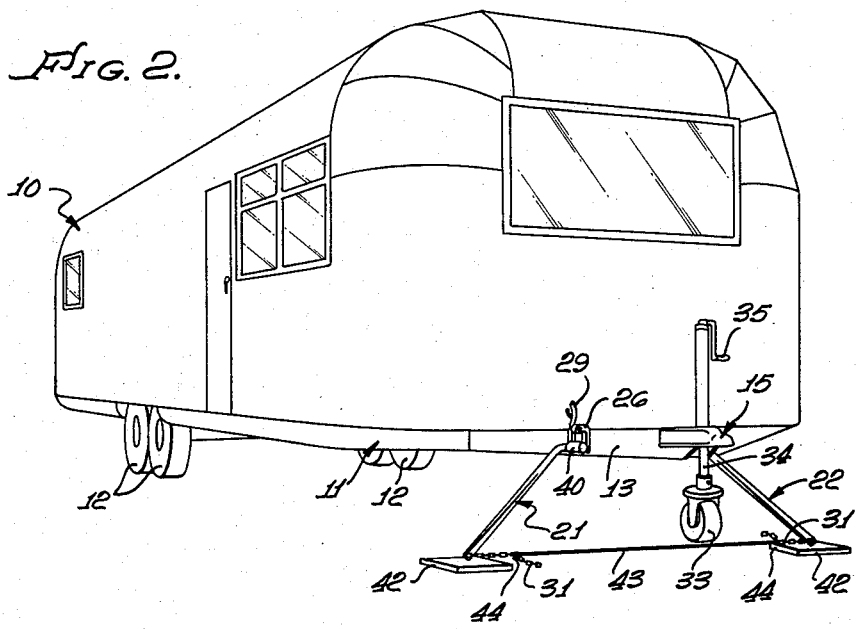
Figure 2 is a perspective view of a house trailer showing a preferred embodiment of this invention.

When the struts 21 and 22 are in place as shown in Figure 2, the crank 35 is manually operated to lower the weight of the forward end of the trailer to rest on the struts 21 and 22, thereby tensioning the rod 43. In this position the angularity of the struts prevents lateral shifting movement of the forward end of the trailer. If it should be necessary to adjust the height of the forward end of the trailer, this may be accomplished by raising the forward end by means of the crank 35 and auxiliary wheel 33 and selecting other links for engagement by the hooks 44 of the tension bar 43, so that upon re-lowering of the forward end of the trailer, the height above ground is changed.

While I have described my invention in connection with struts 21 and 22 which are otherwise employed as helper spring bars of trailer hitch assemblies as shown in Figure 1, it will be understood that struts of other types may be employed if desired.

Having fully described my invention, it is to be understood that I do not wish to be limited to the details set forth herein but my invention is of the full scope of the appended claims.

I claim:

1. In a device of the class described for use with a trailer having a frame including a pair of frame members diverging from the forward end of the frame, the improvement comprising, in combination: a pair of struts each having a relatively long shank and a relatively short stem connected thereto at an angle, a pair of socket elements, means whereby each socket element may be secured in generally horizontal position relative to one of the diverging frame members, respectively, each socket element being adapted to receive the stem of one of said struts, respectively, the projecting end of each strut remote from its respective stem being adapted to rest upon a ground support with the shank in inclined position, a tension element extending between the projecting ends of the struts to prevent separation thereof, whereby the struts may extend outward and downward from said diverging frame members to support the forward end of the trailer frame and prevent lateral shifting movement thereof.

2. In a device of the class described for use with a trailer having a frame including a pair of frame members diverging from the forward end of the frame, the improvement comprising, in combination: a pair of struts each having a relatively long shank and a relatively short stem connected thereto at an angle, a pair of socket elements, means whereby each socket element may be secured in generally horizontal position relative to one of the diverging frame members, respectively, each socket element being adapted to receive the stem of one of said struts, respectively, the projecting end of each strut remote from its respective stem being adapted to rest upon a ground support with the shank in inclined position, a tension element extending between the projecting ends of the struts to prevent separation thereof, whereby the struts may extend outward and downward from said diverging frame members to support the forward end of the trailer frame and prevent lateral shifting movement thereof and means whereby the length of the tension element may be adjusted.

3. In a device of the class described for use with a trailer having a frame including a pair of frame members diverging from a trailer hitch connection part, the improvement comprising, in combination: a pair of struts each having a relatively long shank and a relatively short cylindrical stem connected thereto substantially at right angles, a pair of tubular socket elements, means whereby each socket element may be secured with its axis parallel to one of the diverging frame members, respectively, each socket element being adapted to receive the stem of one of said struts, respectively, the projecting end of each strut remote from its respective stem being adapted to rest upon a ground support with the shank in inclined position, a length of chain attached to the projecting end of each strut, a tension bar connecting the chains to prevent separation of said ends of the struts, whereby the struts may extend outward and downward from said diverging frame members to support the forward end of the trailer frame and prevent lateral shifting movement thereof.

No references cited.